United States Patent
Wada et al.

(10) Patent No.: US 7,099,256 B2
(45) Date of Patent: Aug. 29, 2006

(54) BI-PHASE MARK REPRODUCTION APPARATUS AND OPTICAL DISK DRIVE DEVICE WITH THE SAME

(75) Inventors: Yasuhiro Wada, Onojo (JP); Keisuke Umeda, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 859 days.

(21) Appl. No.: 10/273,118

(22) Filed: Oct. 18, 2002

(65) Prior Publication Data
US 2003/0081524 A1 May 1, 2003

(30) Foreign Application Priority Data
Oct. 31, 2001 (JP) .............................. 2001-334088

(51) Int. Cl.
*G11B 20/10* (2006.01)
(52) U.S. Cl. ................... 369/59.21; 369/53.35
(58) Field of Classification Search .................... None
See application file for complete search history.

(56) References Cited
U.S. PATENT DOCUMENTS
5,917,783 A * 6/1999 Kobayashi et al. ...... 369/59.25
6,233,219 B1 * 5/2001 Hori et al. ................ 369/275.4
6,785,213 B1 * 8/2004 Shishido et al. ......... 369/59.25

FOREIGN PATENT DOCUMENTS
JP 10312639 11/1998

\* cited by examiner

*Primary Examiner*—Paul W. Huber
(74) *Attorney, Agent, or Firm*—Stevens, Davis, Miller & Mosher, LLP

(57) ABSTRACT

A bi-phase mark reproduction apparatus which reduces an error rate of demodulated data by half and improves demodulation ability of ATIP and an optical disk drive device are provided. The bi-phase mark reproduction apparatus includes a data conversion unit which takes out a synchronous code portion, a data portion and an error detection code portion from a bi-phase mark input signal by means of a data separating signal and demodulates data of the data portion and the error detection code portion. The data conversion unit includes a pattern retrieval unit which detects a predetermined error pattern contained in the data portion and a conversion table which decodes the error pattern in accordance with a replacement rule based on bi-phase mark modulation.

7 Claims, 10 Drawing Sheets

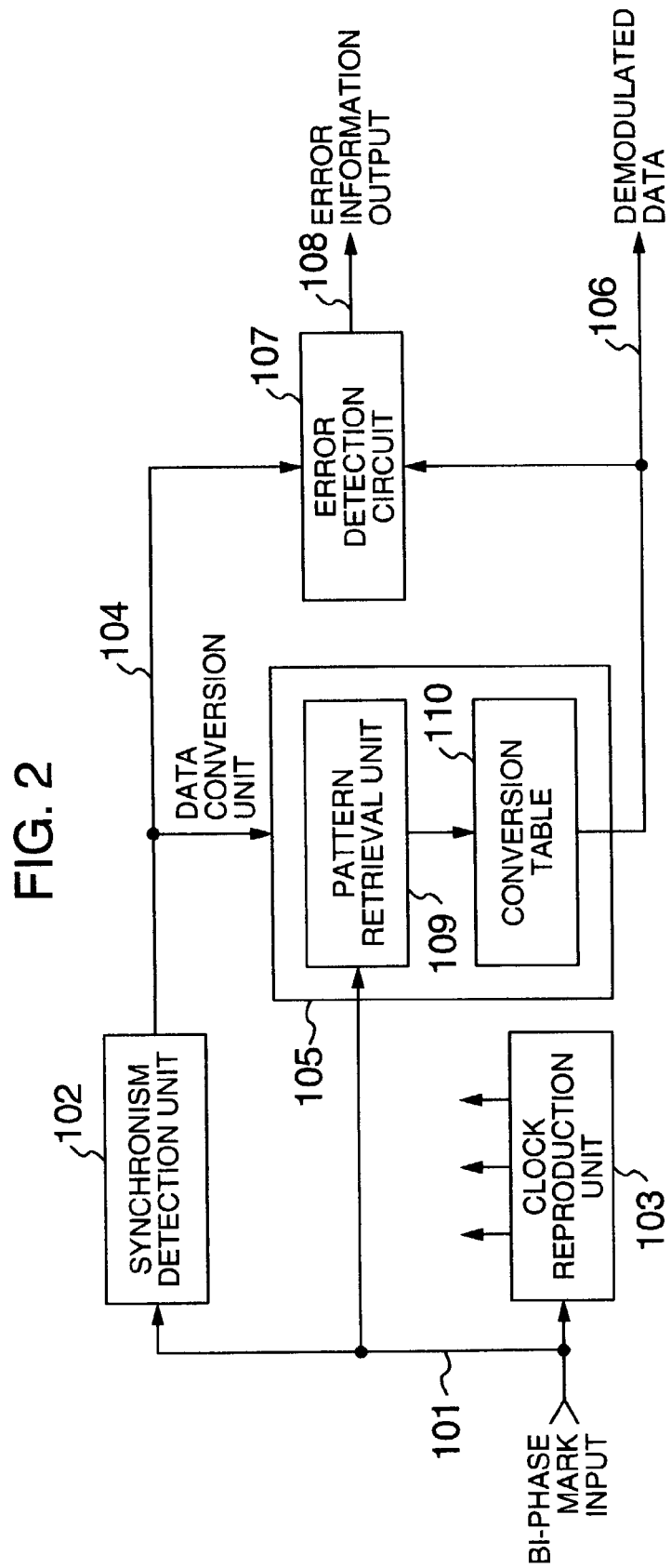

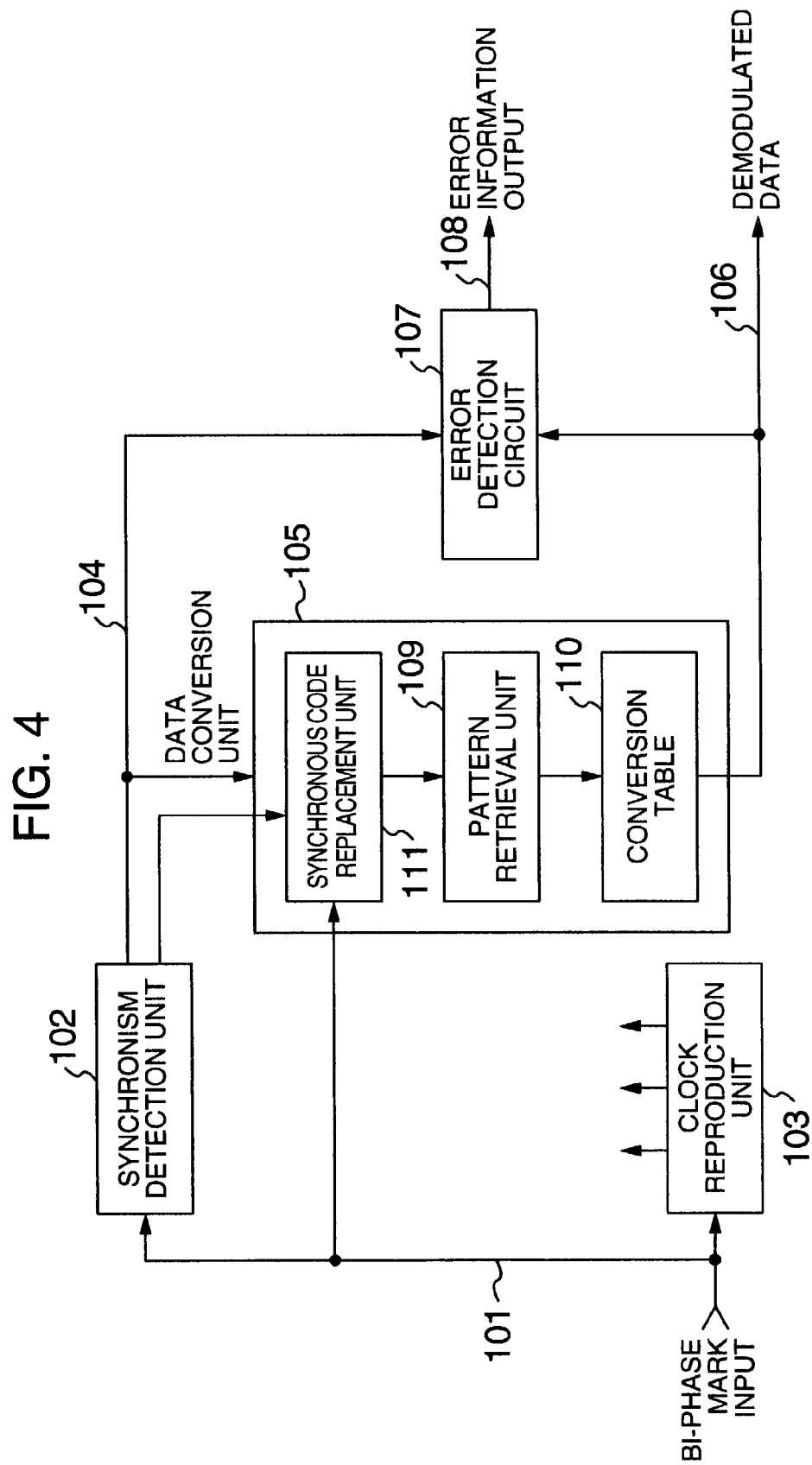

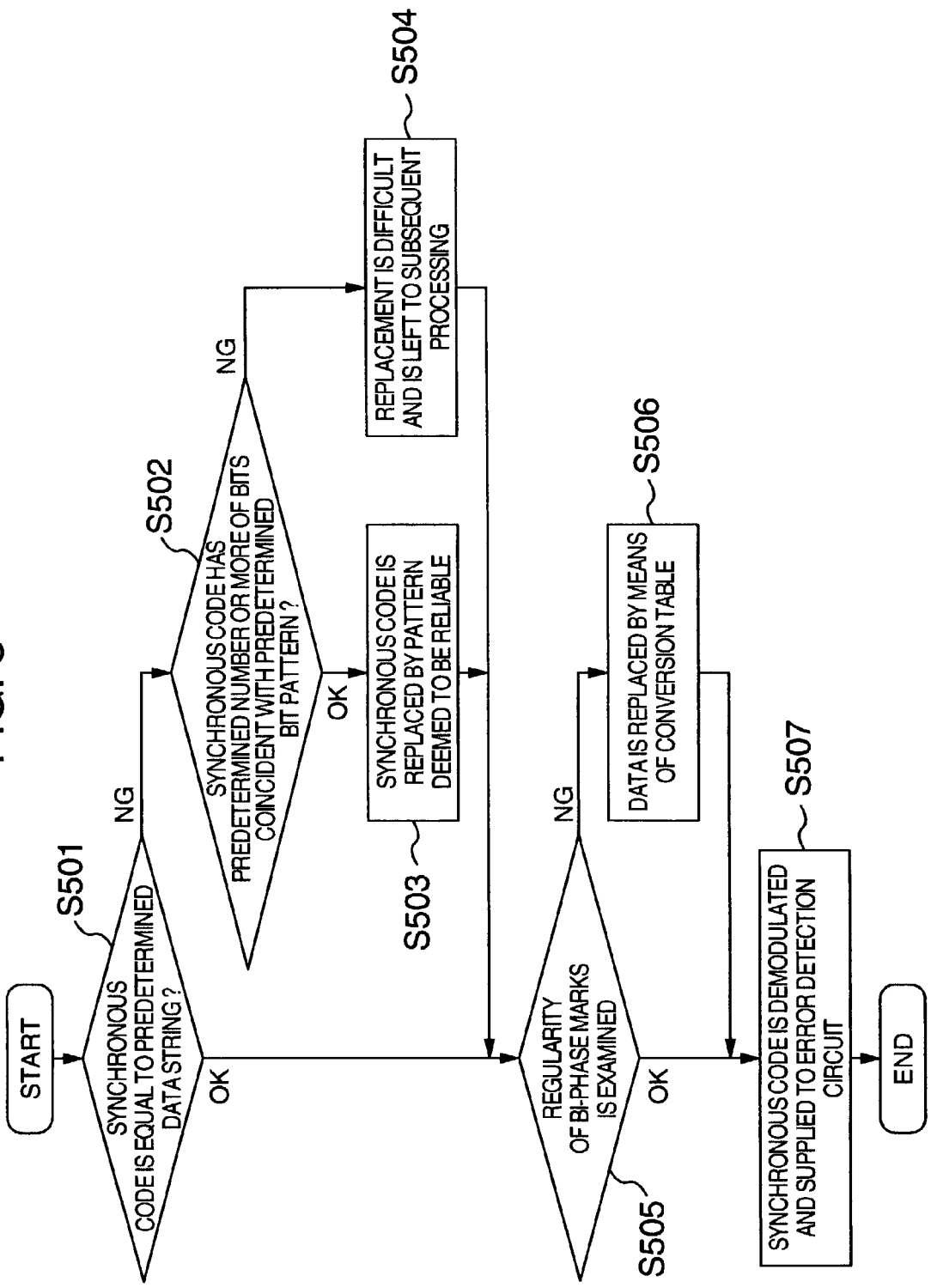

FIG. 7

CONVERSION TABLE 2

| INPUT | | AFTER CONVERSION | |
|---|---|---|---|
| a | b | | |
| 0 0 | 0 0 | 0 1 | 0 0 |
| 0 1 | 0 0 | 0 1 | 0 1 |
| 1 0 | 0 0 | 0 0 | 1 0 |
| 1 1 | 0 1 | 1 1 | 1 1 |
| 0 0 | 1 0 | 1 1 | 0 0 |
| 0 1 | 1 0 | 1 0 | 0 1 |
| 1 0 | 1 1 | 1 0 | 1 0 |
| 1 1 | 1 1 | 1 1 | 1 1 |

FIG. 11
PRIOR ART
| Nr of bits | 4 | 8 | 8 | 8 | 14 |
|---|---|---|---|---|---|
| Bit position | 1234 | 111<br>56789012 | 11111112<br>34567890 | 22222222<br>12345678 | 23333333333444<br>90123456789012 |
| Data | Sync | Minutes | Seconds | Frames | CRC remainder |
FIG. 12
PRIOR ART
WHEN VALUE JUST BEFORE SYNC IS 0
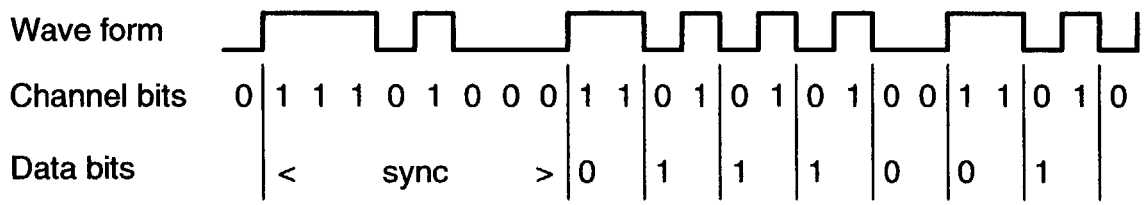
FIG. 13
PRIOR ART
WHEN VALUE JUST BEFORE SYNC IS 1
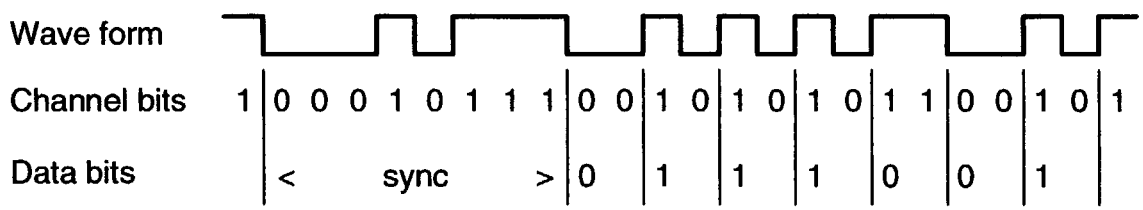

US 7,099,256 B2

BI-PHASE MARK REPRODUCTION APPARATUS AND OPTICAL DISK DRIVE DEVICE WITH THE SAME

BACKGROUND OF THE INVENTION

1. Field of the Invention

The present invention relates to a bi-phase mark reproduction apparatus which can correct an error produced in bi-phase marks on the basis of regularity of the bi-phase marks so that an error rate of demodulated data can be reduced by half and an optical disk drive device equipped with the same.

2. Description of the Related Art

Heretofore, an optical disk such as CD-R and CD-RW is provided with guide grooves named pre-grooves so as to form tracks upon recording of data. The grooves meander very slightly in the radial direction thereof with a meandering amount of about ±0.03 μm and are named wobbles. The wobbles are FM modulated in 22.05 kHz±1 kHz when a medium is reproduced at a standard speed. That is, data FM-modulated with frequency shift of ±1 kHz is added onto a carrier of 22.05 kHz.

The data recorded by the FM modulation includes absolute time information (hereinafter referred to as address information) recorded on the medium. This information is named ATIP (Absolute Time In Pre-grooves). The ATIP includes control signals such as a maximum recordable time and laser power setting information upon recording, recommended to the medium in addition to the address information.

FIG. 11 shows a frame format of the ATIP. The ATIP data constitutes the frame shown in FIG. 11. The frame format includes "Sync" of a synchronous code, "Minutes", "Seconds" and "frames" constituting time information and "CRC remainder" for error detection. The "Minutes", "Seconds" and "frames" constituting the time information are sometimes represented as "data portion" collectively as information for decision of an address. FIG. 12 shows the bi-phase mark signal and the ATIP data when a value just before the synchronous code is "0" and FIG. 13 shows the bi-phase mark signal and the ATIP data when a value just before the synchronous code is "1". The bi-phase mark signal is subjected to the bi-phase mark modulation as shown in FIGS. 12 and 13 and then recorded (cut in an original disk) in the medium.

The bi-phase mark modulation is now described. Referring to FIG. 11, in the frame format of the ATIP, 4 bits are assigned to the "Sync" of the synchronous code, 8 bits to the "Minutes", 8 bits to the "Seconds" and 8 bits to the "Frames" constituting the time information and 14 bits to the "CRC remainder" for the error detection as data. The ATIP data is subjected to the bi-phase mark modulation.

As shown in FIGS. 12 and 13, the bi-phase mark modulation is to convert data bits into data for channel bits by double bit clocks. For example, 4 bits are converted into 8 bits. In the modulation, when bit data before conversion is "0", the channel bit data is assigned any of "00" and "11" by selecting it so that reversal of bits in the channel bit data is made before and behind each partition for every two bits. On the other hand, when bit data before conversion is "1", the channel bit data is assigned any of "10" and "01" so that reversal of bits in the channel bit data is made before and behind each partition for every two bits. Accordingly, one-bit data before conversion is converted into the channel bit data so that reversal of bits in the channel bit data is made before and behind each partition for every two bits.

Whether bit data of "0" before conversion is converted into any of "00" or "11" and whether bit data of "1" before conversion is converted into any of "10" or "01" are decided depending on whether a bit produced just before in the channel bit data is "0" or "1". For example, when the "Minutes" is "0110", it is converted into "00101011" or "11010100". This conversion is decided depending on whether a bit produced just before the "Minutes" is "0" or "1". When the bit is "0", the "Minutes" is converted into "11010100" and when the bit is "1", the "Minutes" is converted into "00101011".

The channel bit data is recorded as wobble as shown by the wave form of FIGS. 12 and 13. The ATIP information read out from an optical disk is subjected to error detection by means of CRC of the "CRC remainder" and when there is no error, the ATIP information is utilized.

In reproduction of the ATIP (bi-phase mark), information is sometimes lost due to stain or flaw on the optical disk or disturbance in focusing, tracking or control of a spindle or the like. At this time, in an optical disk drive device such as CD-R and CD-RW, since the control of the spindle upon writing uses a period of the synchronous signal in the ATIP as a fundamental wave, it is necessary to avoid disappearance of synchronization or taking-in of wrong data when the bi-phase mark information is lost during writing.

FIG. 14 is a block diagram schematically illustrating a conventional bi-phase mark reproduction apparatus. In FIG. 14, numeral 1101 represents a bi-phase mark input signal read out from an optical disk, 1102 a synchronism detection unit which extracts a synchronous code from the bi-phase mark input signal 1101 and produces a signal taking-out timing, 1103 a clock reproduction unit which reproduces a clock signal on the basis of a signal edge in the bi-phase mark signal 1101 by means of PLL, and 1104 a data separating signal which is produced by the synchronism detection unit 1102 to separate the synchronous code portion ("Sync" of FIG. 11), the data portion ("Minutes", "Seconds" and "frames" of FIG. 11) and the error detection code portion ("CRC remainder" of FIG. 11).

Numeral 1105 represents a data conversion unit which separates the synchronous code portion from the bi-phase mark input signal 1101 by the data separating signal 1104 and demodulates data of the data portion and the error detection code portion, 1106 demodulated data which is produced by the data conversion unit 1105 after being demodulated by the data conversion unit 1105, and 1107 an error detection circuit which subjects the data 1106 demodulated by the data conversion unit 1105 to the error detection by means of CRC. As a result of the error detection, an error information output 1108 indicates whether the demodulated data 1106 is valid (error is not contained) or invalid (error is contained).

In reproduction, the bi-phase mark signal read out from the optical disk such as CD-R and CD-RW is synchronized with the clock signal from the clock reproduction unit 1103 in the synchronism detection unit 1102 and the data conversion unit 1105 to be converted into the channel bit data. The synchronism detection unit 1102 detects 8-bit synchronous code (11101000 and 00010111) shown in FIGS. 12 and 13 from the channel bit data and produces the data separating signal 1104.

In the data conversion unit 1105, the channel bit data left by removing the synchronous code in accordance with the data separating signal 1104 is demodulated into the data bits each constituting one bit for every two bits. The demodulation is made in accordance with the rule that when the channel bit data of two bits is "00" or "11", it is demodulated into "0" and when it is "01" or "10", it is demodulated into "1". At this time, as described above, the channel bit data is necessarily reversed before and behind the partition of the demodulation unit of two bits and the synchronous code (that is, "0" is reversed to "1" and "1" is reversed to "0").

As described above, the data 1106 demodulated by the data conversion unit 1105 is subjected to the error detection using CRC in the error detection circuit 1108 to judge whether the demodulated data 1106 contains no error and is valid or contains any error and is invalid. Only the demodulated data 1106 judged to be valid is used as the ATIP information.

When the ATIP information is read out from the optical disk, the bi-phase mark signal is sometimes lost or disturbed due to stain or flaw on the optical disk or disturbance in focusing, tracking or control of a spindle or the like. In this case, in the conventional processing described above, when the bi-phase mark signal is lost or disturbed, the signal is converted into wrong channel bit data and accordingly error is sometimes produced in the demodulated data. Further, the wrong demodulated data is distinguished by the error detection using CRC and is judged to be invalid and accordingly there is a problem that the ATIP information for the wrong demodulated data portion is not obtained. When the ATIP information is not obtained continuously upon writing, it sometimes happens that the control of spindle is impossible and the writing is stopped.

SUMMARY OF THE INVENTION

It is an object of the present invention to solve the problems in the prior art by providing a bi-phase mark reproduction apparatus which reduces an error rate of demodulated data by half and improves the demodulation ability of ATIP.

Further, it is another object of the present invention to provide an optical disk drive device which reduces an error rate of demodulated data by half and improves the demodulation ability of ATIP.

The bi-phase mark reproduction apparatus of the present invention includes a synchronism detection unit supplied with a signal modulated by bi-phase marks to produce a data separating signal for separating the signal into constituent portions thereof, a data conversion unit for taking out a synchronous code portion, a data portion and an error detection code portion from a bi-phase mark input signal by means of the data separating signal and demodulating data of the data portion and the error detection code portion, and error detection means for performing error detection to the data demodulated by the data conversion unit. The data conversion unit includes pattern retrieval unit for detecting a predetermined error pattern contained in the data portion, and a conversion table for converting the error pattern into a corrected data string in accordance with a replacement rule based on the bi-phase mark modulation.

Thus, an error produced in the bi-phase marks can be corrected on the basis of regularity of the bi-phase marks to thereby reduce an error rate of demodulated data by half and improve the ATIP demodulation ability.

Further, the optical disk drive device of the present invention comprises the bi-phase mark reproduction apparatus.

BRIEF DESCRIPTION OF THE DRAWINGS

FIG. 2 is a block diagram schematically illustrating a bi-phase mark reproduction apparatus of FIG. 1.

FIG. 4 is a block diagram schematically illustrating a bi-phase mark reproduction apparatus of FIG. 1 in an embodiment 2 of the present invention.

FIG. 5 is a flow chart showing processing of a data conversion unit of the bi-phase mark reproduction apparatus in the embodiment 2 of the present invention.

FIG. 7 is a diagram showing a conversion table 2 of a data conversion unit of FIG. 6.

FIG. 8 is a diagram showing a conversion table 3 of the data conversion unit in an embodiment 4 of the present invention.

FIG. 9 is a diagram showing a conversion table 4 in the embodiment 4 of the present invention.

FIG. 11 is a diagram showing a frame format of ATIP.

FIG. 12 is a diagram showing a bi-phase mark signal and ATIP data when a value just before a synchronous code is "0".

FIG. 13 is a diagram showing a bi-phase mark signal and ATIP data when a value just before a synchronous code is "1".

DESCRIPTION OF THE EMBODIMENTS

Embodiment 1

Figure 1:
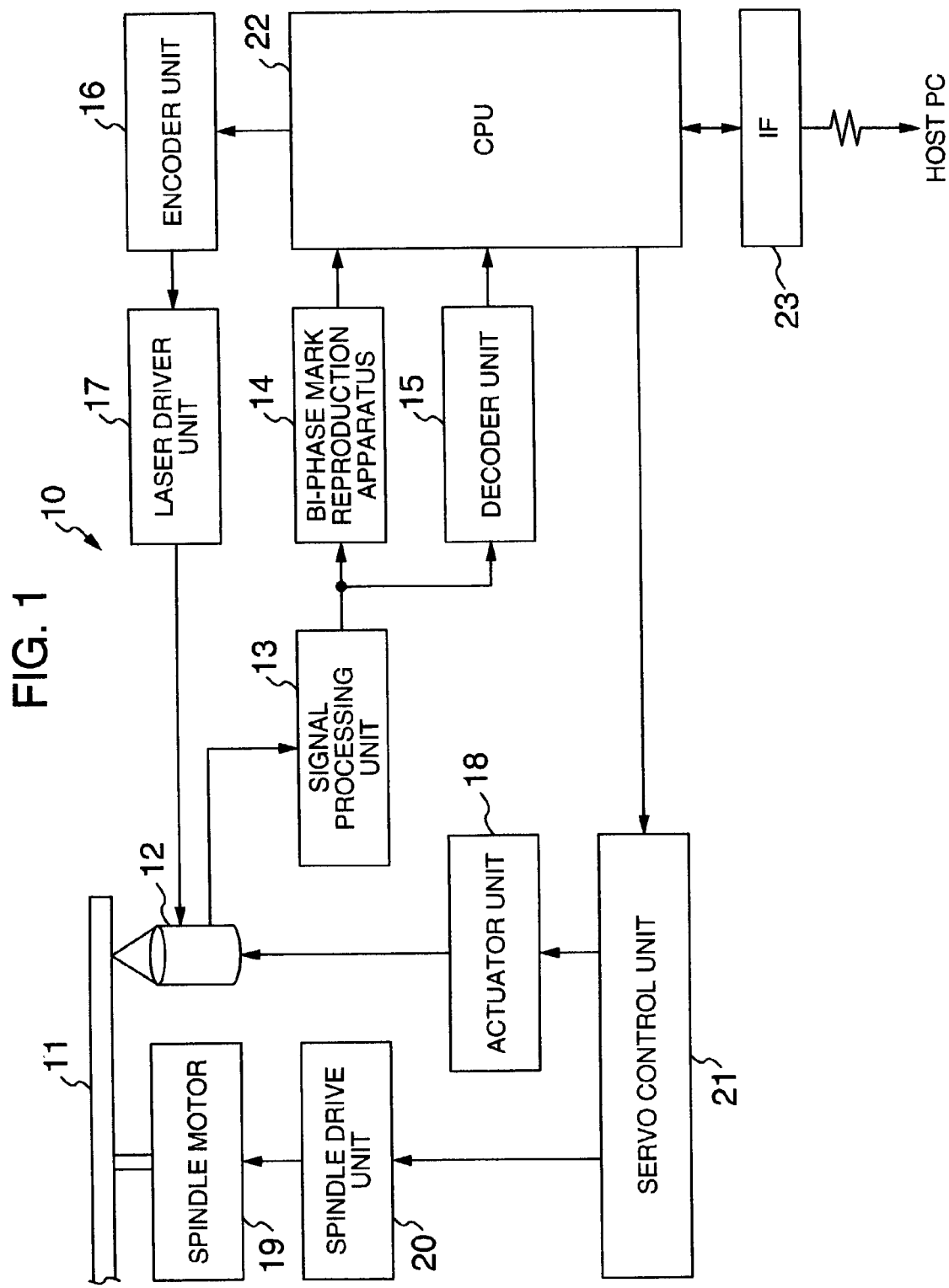
FIG. 1 is a block diagram schematically illustrating an optical disk drive device according to an embodiment 1 of the present invention.

A bi-phase mark reproduction apparatus of an optical disk drive device and an improvement method of an error rate in an embodiment 1 of the present invention are now described. FIG. 1 is a block diagram schematically illustrating an optical disk drive device using an optical disk such as CD-R and CD-RW in the embodiment 1 of the present invention.

In FIG. 1, the optical disk drive device 10 of the present invention includes an optical pickup 12 which performs writing and reading of data from an optical disk 11 by irradiating the optical disk 11 with laser light. The optical disk drive device 10 includes a signal processing system containing a signal processing unit 13 which digitizes a signal produced by the optical pickup 12 into a binary signal and produces a control signal, a bi-phase mark reproduction apparatus 14 which performs ATIP processing, a decoder unit 15 which demodulates data from the signal processing unit 13 and an encoder unit 16 which encodes data transferred from a host.

Further, the optical disk drive device 10 includes a drive system containing a laser drive unit 17 which controls light emission and irradiation of the laser light from the optical pickup 12, an actuator unit 18 which controls focusing and tracking operation of the optical pickup 12 and a spindle drive unit 20 which controls to drive a spindle motor 19 for rotating the optical disk 11, a servo control unit 21 which performs servo control of each unit of the drive system by control signals from the signal processing system, a central processing unit (CPU) 22 which controls the whole of the system and an interface (IF) 23 between a host PC and the optical disk drive device 10.

FIG. 2 is a block diagram schematically illustrating the bi-phase mark reproduction apparatus 14. In FIG. 2, numeral 101 represents a bi-phase mark input signal which is a digitized or binary-coded data signal produced from the signal processing unit 13, 102 a synchronism detection unit which extracts a synchronous code from the bi-phase mark input signal 101 and produces a signal separating timing, and 103 a clock reproduction unit which reproduces a clock signal on the basis of a signal edge in the bi-phase mark signal 101 by means of PLL (Phase-Locked Loop). When a CD-R or CD-RW is rotated at a standard speed, the wobble frequency is defined to be 22.1±0.5 kHz, which is a clock frequency reproduced by the clock reproduction unit 103. This is abbreviated to a standard clock. Numeral 104 represents the signal which is produced by the synchronism detection unit 102 and is a data separating signal for separating the synchronous code portion ("Sync" of FIG. 11), the data portion ("Minutes", "Seconds" and "frames" of FIG. 11) and the error detection code portion ("CRC remainder" of FIG. 11).

Numeral 105 represents a data conversion unit which separates the synchronous code portion from the bi-phase mark input signal 101 by means of the data separating signal 104 and demodulates data of the data portion and the error detection code portion, 106 demodulated data which is produced by the data conversion unit 105 by being demodulated by the data conversion unit 105, 107 an error detection circuit constituting error detection unit which subjects the data 106 demodulated by the data conversion unit 105 to the error detection using CRC, and 108 an error information output which indicates whether the demodulated data 106 is valid or invalid.

Numeral 109 represents pattern retrieval unit which is provided in the data conversion unit 105 to detect a predetermined error pattern contained in the bi-phase mark input signal 101, and 110 a conversion table which is also provided in the data conversion unit 105 to convert the predetermined error pattern detected by the pattern retrieval unit 109 into a corrected data string deemed to be proper.

Figures 3A, 3B:
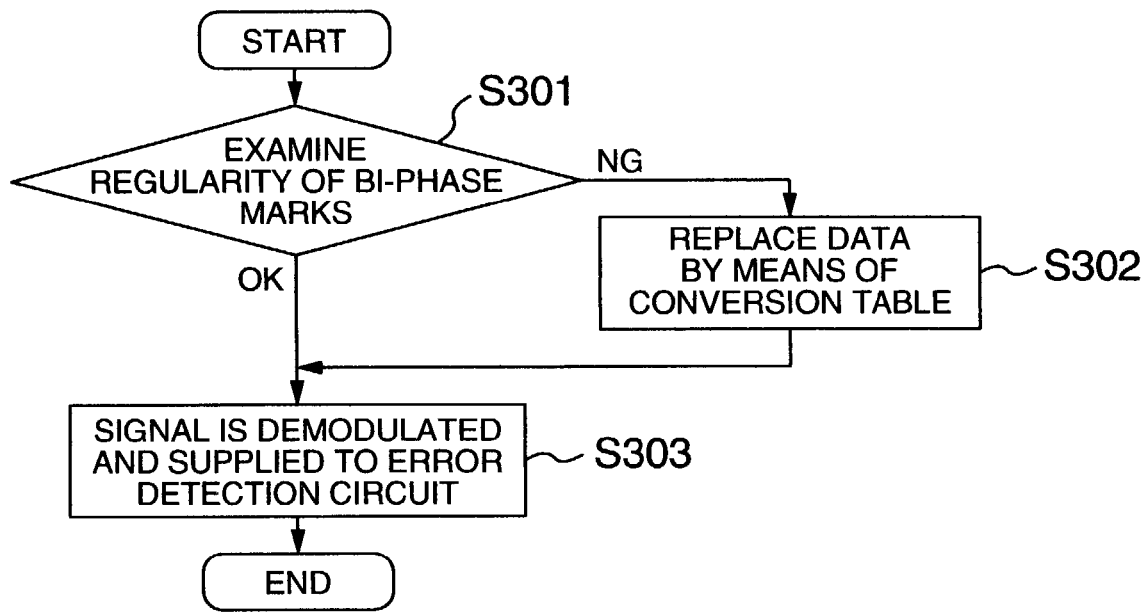
FIG. 3A is a flow chart showing processing of a data conversion unit of FIG. 1.
FIG. 3B is a diagram showing a conversion table 1 of the data conversion unit of FIG. 1.

Thus, how to perform detection and correction of an error pattern by the data conversion unit 105 is now described. FIG. 3A is a flow chart showing processing of the data conversion unit of FIG. 1 and FIG. 3B shows a conversion table 1 of the data conversion unit 105 of FIG. 1.

In FIGS. 2 and 3A, when a bi-phase mark input signal 101 is supplied, the pattern retrieval unit 109 detects whether an error pattern is contained in the bi-phase mark input signal 101 or not to examine the regularity of the bi-phase marks (S301). In the examination of the regularity of the error pattern, it is examined whether 0 and 1 are reversed before and behind each partition for every two bits of inputted data or not. The conversion table 110 records the conversion table 1 shown in FIG. 3B. The conversion table 1 of FIG. 3B shows error patterns that 0 and 1 are not reversed before and behind each partition for every two bits. The inputted data containing the pattern shown in the conversion table 110 does not satisfy the regularity of the bi-phase marks.

When a signal which does not satisfy the regularity of the bi-phase marks is inputted as the bi-phase mark input signal 101, the data conversion unit 105 of the embodiment 1 makes partial replacement of the input data in accordance with the replacement rule based on the bi-phase mark modulation by means of the conversion table 110 (S302). As shown in FIG. 3B, the replaced data has 0 and 1 reversed before and behind the partition for every two bits and satisfies the regularity of the bi-phase mark modulation. In the conversion table 1 of FIG. 3B, data in the column shown by arrow a is corrected on the assumption that data in the column shown by arrow b is correct.

Processing for the signal satisfying the regularity of the bi-phase marks in step S301 proceeds to step S303 as it is and the signal which does not satisfy the regularity of the bi-phase marks in step S301 is converted by means of the conversion table 1 (S302), so that the signal is subjected to the demodulation to be produced as the demodulated data 106 and to be supplied to the error detection circuit 107 (S303).

In the conversion table 110, the portion shown by arrow a is assumed to be error and is corrected, although there is the case where the portion shown by arrow b is in error actually. In other words, when the conversion table 110 of the embodiment 1 is used, an error existing at the portion shown by arrow a can be corrected while when an error exists at the portion shown by arrow b, an additional error is further produced. However, when an error exists in the portion shown by arrow b, the error is detected by the error detection circuit 107 originally whether the portion shown by arrow a is correct or not and accordingly the number of errors does not increase and any problem is not produced newly. Hence, the data conversion unit 105 of the embodiment 1 can improve the error rate of the bi-phase mark signal by the probability (about 50%) that an error exists in the portion shown by arrow a.

Embodiment 2

An optical disk drive device and an error rate improvement method in the embodiment 2 of the present invention are now described. FIG. 4 is a block diagram schematically illustrating the bi-phase mark reproduction apparatus of FIG. 1 in the embodiment 2 of the present invention. The same constituent elements as those of the embodiment 1 are designated by the same reference numerals and detailed description thereof is omitted.

In FIG. 4, the data conversion unit 105 further includes synchronous code replacement unit 111. The synchronous code replacement unit 111 of the bi-phase mark reproduction apparatus 14 of the embodiment 2 is to replace a wrong synchronous code in accordance with a predetermined processing rule. More particularly, the synchronous code replacement unit 111 is supplied with the bi-phase mark input signal 101 and the data separating signal 104 and takes out the synchronous code portion. Further, the synchronous code replacement unit 111 compares the obtained synchronous code portion with a predetermined pattern, such as, for example, "11101000", "00010111" of the bi-phase marks to judge whether 7 bits or more, for example, are coincident or not. When the predetermined number or more of bits are coincident, the synchronous code replacement unit 111 replaces it with the synchronous code deemed to be reliable.

For example, when all bits (all of 8 bits) are coincident, the correct synchronous code portion is naturally reproduced and accordingly it is not necessary to replace the synchronous code. Further, when too much bits (7 bits of 8 bits) are not coincident, it is difficult to establish the synchronous code deemed to be reliable and accordingly it is impossible to replace the synchronous code by the correct synchronous code. In the error that actually occurs most frequently, only 1 or 2 bits are not coincident.

The embodiment 2 can function most effectively for the case as described above so that replacement is made by the synchronous code portion deemed to be reliable when 1 bit is not coincident (conversely 7 bits are coincident) as exemplified above. Accordingly, when 1 to 4 bits are not coincident, replacement can be performed by the synchronous code replacement unit 111. However, since circumstances of error are changed due to performance of the optical pickup 12 or the signal processing unit 13 or state of user's optical disk 11, it is desirable to set the number of bits not coincident to a predetermined number of bits in consideration of the state of use.

Next, how to perform detection and correction of an error pattern by the data conversion unit 105 of the embodiment 2 is described. FIG. 5 is a flow chart showing processing of the data conversion unit of the bi-phase mark reproduction apparatus in the embodiment 2 of the present invention.

In FIG. 5, first, it is examined whether the synchronous code of the bi-phase mark input signal 101 is equal to a predetermined data string or not (S501). When it is equal to the predetermined data string, the processing proceeds to next step S505 as it is.

When it is not equal to the predetermined data string, it is next examined whether the synchronous code has a predetermined number or more of bits coincident with the predetermined bit pattern (S502). When the predetermined number or more of bits are coincident with the predetermined bit pattern, the synchronous code replacement unit 111 replaces the synchronous code by the synchronous code deemed to be reliable (S503). When the predetermined number or more of bits are not coincident with the predetermined bit pattern, the replacement of the synchronous code is not performed and is left to processing in the subsequent stage or steps (S504).

Thereafter, the regularity of the bi-phase marks is examined (S505) and when the regularity is satisfied, the processing proceeds to next step S507 as it is. When the regularity is not satisfied, data is replaced by means of the conversion table 110 (S506). Then, the synchronous code is subjected to the demodulation to be produced as the demodulated data (S507).

Since the data conversion unit 105 of the embodiment 2 includes the synchronous code replacement unit 111 and corrects an error in the synchronous code within the rational range, data subsequent to the synchronous code can be corrected and it can be prevented that an error is produced in the synchronous code itself and the ATIP information is lost, so that the error rate of the bi-phase mark signal can be further improved.

Embodiment 3

Figure 6:
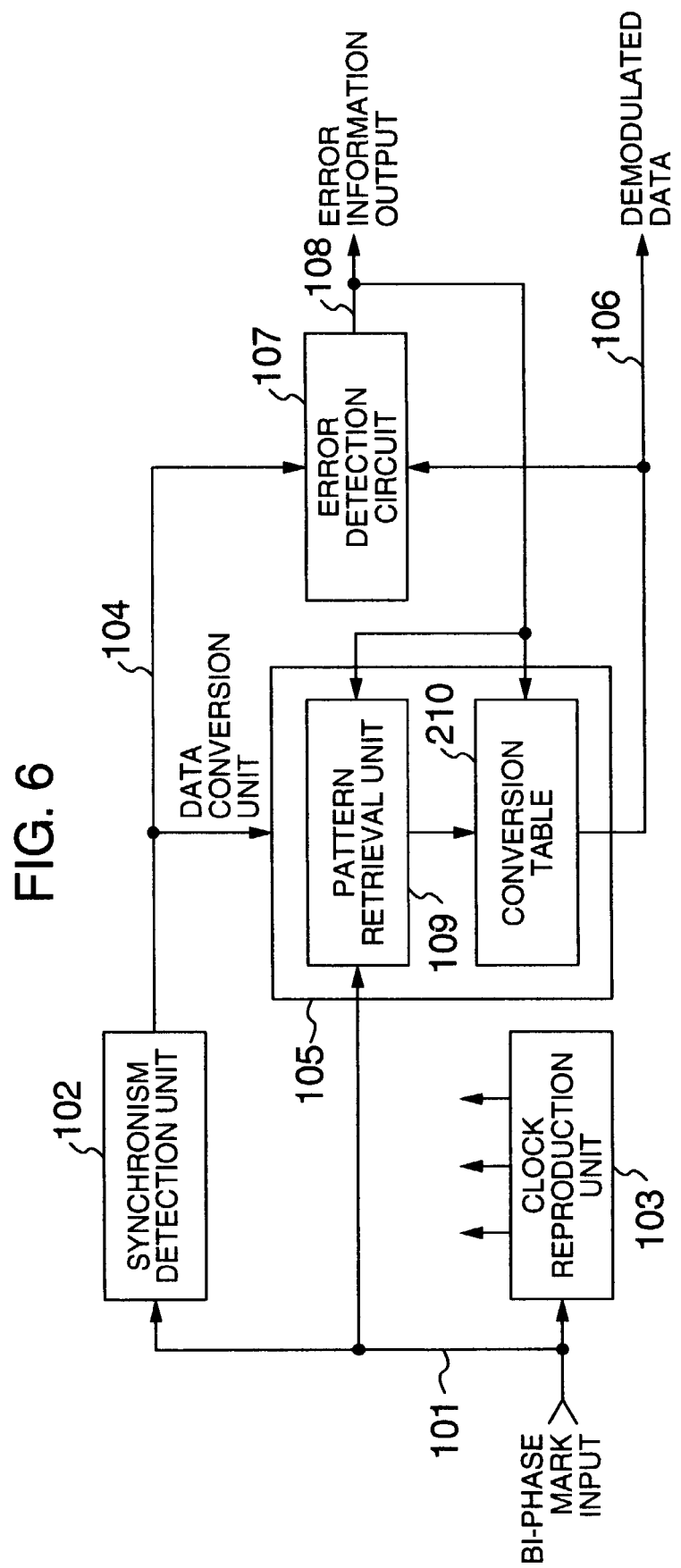
FIG. 6 is a block diagram schematically illustrating a bi-phase mark reproduction apparatus of FIG. 1 in an embodiment 3 of the present invention.

An optical disk drive device and an error rate improvement method in the embodiment 3 of the present invention are now described. FIG. 6 is a block diagram schematically illustrating the bi-phase mark reproduction apparatus of FIG. 1 in the embodiment 3 of the present invention. FIG. 7 shows a conversion table 2 of a data conversion unit of FIG. 6. The conversion table 2 is prepared to convert data in the column shown by arrow b on the assumption that data in the column shown by arrow a is correct.

In FIG. 6, the bi-phase mark reproduction apparatus of the embodiment 3 has basically the same configuration as that of the embodiment 1, while a conversion table 210 also records a conversion table 2 shown in FIG. 7 in addition to the conversion table 1 shown in FIG. 3B. That is, the conversion table 210 records a plurality of conversion tables having different conversion contents. Further, it is configured so that the error information output 108 is fed back to the data conversion unit 105. The conversion table 210 is selected on the basis of the error information output 108 so that the frequency of errors is reduced and the demodulated data 106 is produced. The embodiment of FIG. 6 is different from other embodiments in that the data conversion unit 105 selects and uses the conversion table so that the error rate is most improved.

More particularly, as shown in FIG. 6, the data conversion unit 105 of the embodiment 3 counts the number of errors per unit time from the error information output 108 and changes the conversion tables 1 and 2 in accordance with the frequency of errors. That is, the data conversion unit 105 calculates a rate of the number of errors per unit time and the total number of conversions in case where the conversion table 1 or 2 is used and selects the conversion table so that the frequency of errors is reduced. When the error rate is not improved in replacement of a certain error pattern in accordance with the replacement rule based on the conversion table 1, it is considered that errors exist in the portion shown by arrow b and accordingly the replacement rule based on the conversion table 1 is changed to the replacement rule based on the conversion table 2.

As described above, since the data conversion unit 105 of the embodiment 3 selects the replacement rule that the error rate of the demodulated data is most improved, the error rate of the bi-phase mark signal can be further improved.

Embodiment 4

An optical disk drive device and an error rate improvement method in the embodiment 4 of the present invention are now described. The bi-phase mark reproduction apparatus of the optical disk drive device in the embodiment 4 of the present invention has basically the same configuration as that of the embodiment 3. Further, the conversion table 210 records not only a conversion table 3 shown in FIG. 8 and also a conversion table 4 shown in FIG. 9.

FIG. 8 shows the conversion table 3 of the data conversion unit in the embodiment 4 of the present invention. The conversion table 3 of FIG. 8 takes precedence so that data in the columns shown by arrows a and b are converted so that the demodulated data become 0 on the assumption that the demodulated data 0 is correct. Further, FIG. 9 shows the conversion table 4 of the data conversion unit in the embodiment 4 of the present invention. The conversion table 4 of FIG. 9 takes precedence so that data in the columns shown by arrows a and b are converted so that the demodulated data become 1 on the assumption that the demodulated data 1 is correct.

In the conversion of data, the data conversion unit 105 of the embodiment 4 of the present invention calculates the probability of appearance of 0 or 1 of the demodulated data at the time that it is judged that any error is not contained in the error information output 108 and selects the conversion table that replacement is made to the data having the high probability of appearance. When the appearance probability of the demodulated data 0 is high, the replacement rule is changed to the replacement rule based on the conversion table 3 and when the appearance probability of the demodulated data 1 is high, the replacement rule is changed to the replacement rule based on the conversion table 4.

In this manner, since the data conversion unit 105 of the embodiment 4 selects the replacement rule that the error rate of the demodulated data is most improved, the error rate of the bi-phase mark signal can be further improved.

Embodiment 5

An optical disk drive device and an error rate improvement method in the embodiment 5 of the present invention are now described. The bi-phase mark reproduction apparatus of the optical disk drive device in the embodiment 5 of the present invention has basically the same configuration as that of the embodiment 3. Further, the conversion table 210 includes the conversion table 1 of FIG. 3B, the conversion table 2 of FIG. 7, the conversion table 3 of FIG. 8 and the conversion table 4 of FIG. 9 and further includes still another conversion table, if necessary.

In other words, the data conversion unit 105 confirms the continuity of the demodulated data and judges the regularity concerning error of the data on the basis of the continuity to change the conversion table.

For example, when the bi-phase data not demodulated is "11001100→00110010→00110110→11001010→00101110→00101111→00101011→" in case where the demodulated data is expected to be "0→1→2→3→4→5→6→", the data conversion unit 105 judges on the basis of the continuity of data that 0 at the second bit from the bottom is changed to 1 and selects the replacement rule based on the conversion table 1 or 3 on the basis of the judgment to convert the data. Consequently, the bi-phase data is converted into "11001100→00110010→00110100→11001010→00101100→00101101→00101011→", so that the demodulated data becomes "0→1→2→3→4→5→6→".

As described above, since the data conversion unit 105 of the embodiment 5 selects the replacement rule that the continuity of the demodulated data is best maintained, the error rate of the bi-phase mark signal can be further improved.

Embodiment 6

Figure 10:
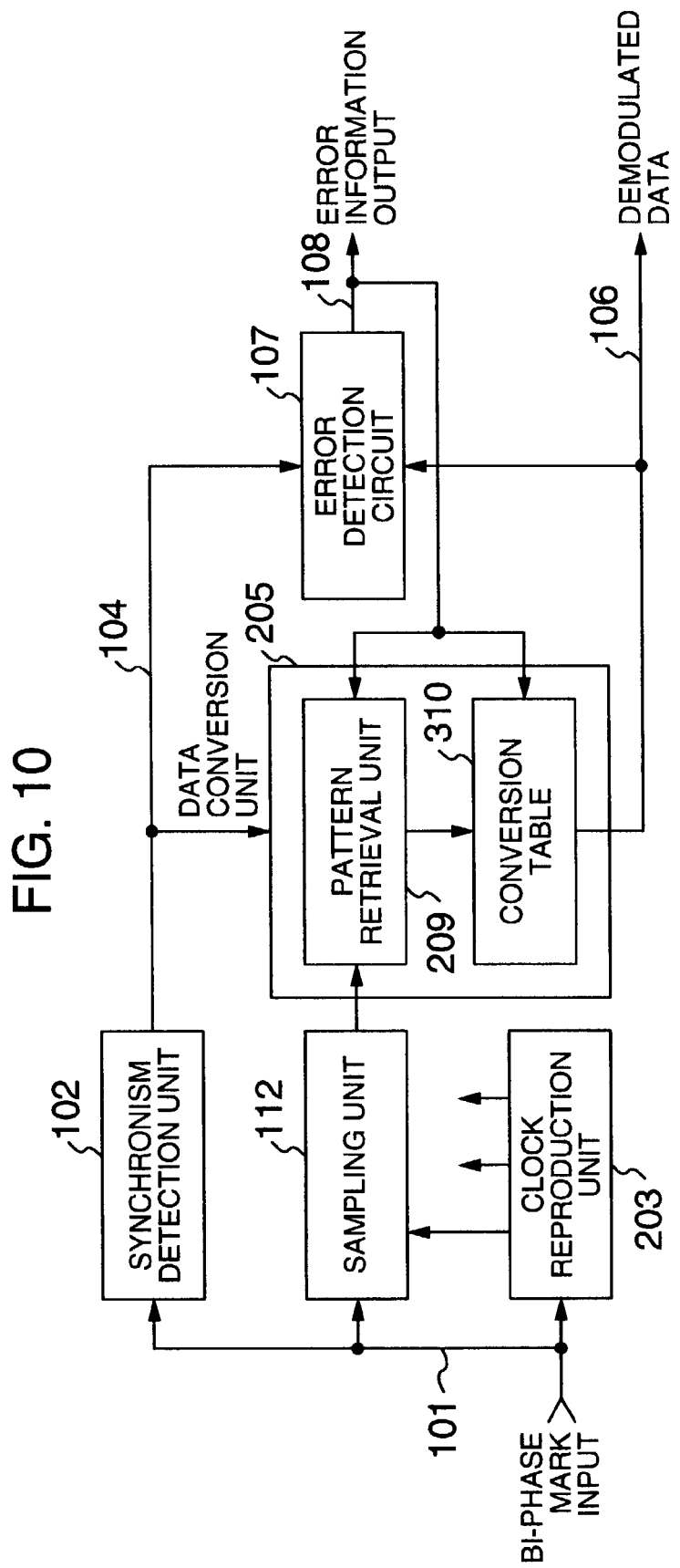
FIG. 10 is a block diagram schematically illustrating a bi-phase mark reproduction apparatus of FIG. 1 in an embodiment 6 of the present invention.
Figure 14:
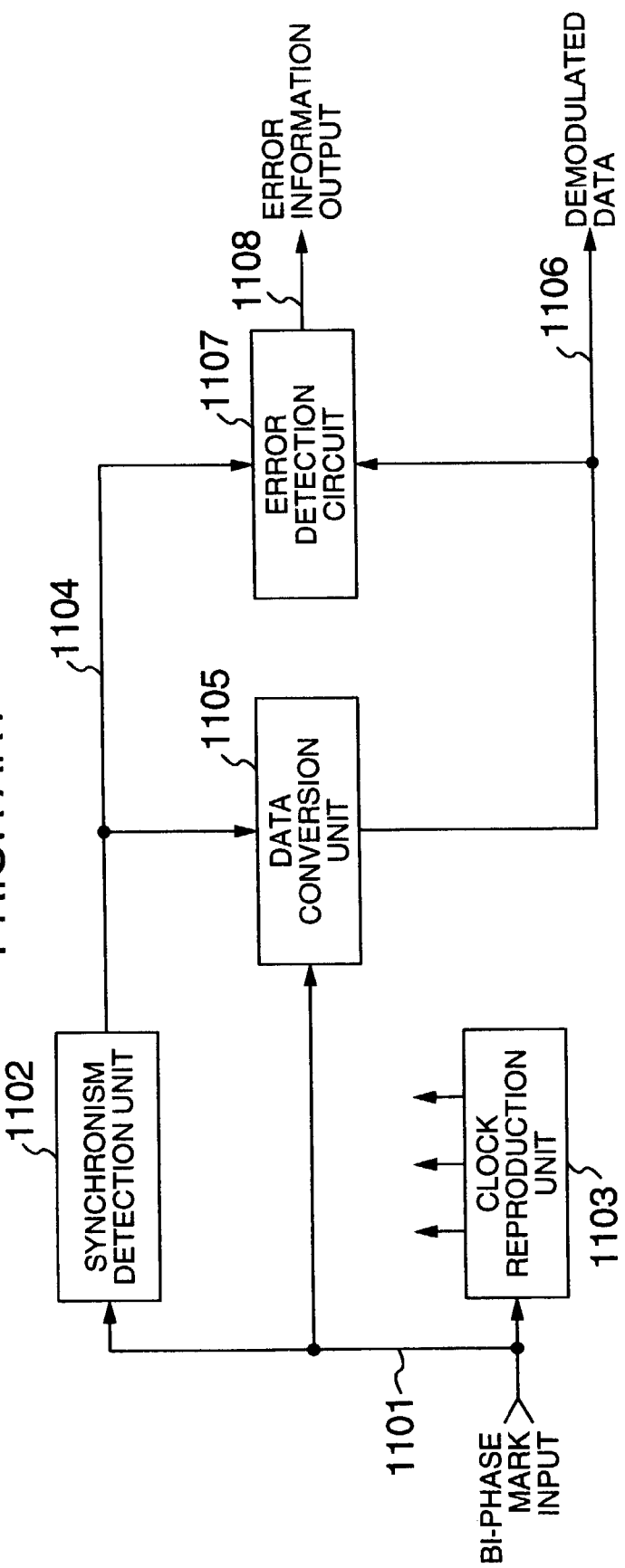
FIG. 14 is a block diagram schematically illustrating a conventional bi-phase mark reproduction apparatus.

An optical disk drive device and an error rate improvement method in the embodiment 6 of the present invention are now described. The bi-phase mark reproduction apparatus of the optical disk drive device in the embodiment 6 of the present invention has basically the same configuration as that of the embodiment 4. The same constituent elements are designated by the same reference numerals and description thereof is omitted. FIG. 10 is a block diagram schematically illustrating the bi-phase mark reproduction apparatus of FIG. 1 in the embodiment 6 of the present invention. In FIG. 10, the clock reproduction unit 203 generates clock signals having not only the original clock rate (standard clock) and also a higher clock rate (equal to an integral multiple of the standard clock rate).

A sampling unit 112 samples the bi-phase mark input signal 101 on the basis of the clock signal having a higher rate supplied from the clock reproduction unit 203 and converts it into a binary signal. Pattern retrieval unit 209 has the function of detecting an error pattern peculiar to the higher clock rate with regard to even an output signal of the sampling unit 112 sampled by the clock of the higher rate in addition to the original function of detecting the predetermined error pattern contained in the bi-phase mark input signal 101. A conversion table 310 converts the error pattern detected by the pattern retrieval unit 209 into a corrected data string deemed to be proper.

More particularly, the bi-phase mark signal 101 is sampled by the clock having the higher clock rate than that of the standard clock used to take in the bi-phase mark signal originally, that is, the clock having the clock rate equal to the integral multiple of the clock synchronized with the bi-phase data string and supplies the sampled signal to the data conversion unit 205. When an error contrary to the replacement rule of the bi-phase modulation is contained in the data of the standard clock, the data string sampled by the clock having the clock rate equal to the integral multiple as higher can be analyzed to thereby detect a mistaken pattern peculiar upon occurrence of error. The data conversion unit 205 of the embodiment 6 samples the bi-phase mark input signal 101 on the basis of the higher clock rate generated by the clock reproduction unit 203. The sampled bi-phase data string is analyzed to detect the mistaken pattern upon occurrence of error peculiar to the higher clock rate and the error caused by this peculiar mistaken pattern is corrected.

For example, the bi-phase marks are taken in by the clock rate of four times as compared with the conventional clock and when it can be analyzed that the error having the bi-phase data "0-0-0-1" is produced for the taken-in data of "0000-0000-0101-1111", this bi-phase data is corrected to be "0-0-1-1". In other words, in this example, "0101" of the bi-phase marks is converted by the clock rate of four times into "1" instead of being converted into "0" in error when data conversion is made by the standard clock. In order to attain such conversion, the conversion table 310 includes the conversion table for the clock rate of four times in this example in addition to the conversion table for the standard clock.

In this manner, since the data conversion unit 205 of the embodiment 6 analyzes and corrects the error pattern peculiar to the high clock rate of the bi-phase mark signal, the error rate of the bi-phase mark signal can be further improved.

As described above, according to the bi-phase mark reproduction apparatus of the present invention, the error produced in the bi-phase marks can be corrected on the basis of the regularity of the bi-phase marks to thereby reduce the error rate of the demodulated data by half and improve the demodulation ability of ATIP.

Further, the optical disk drive device of the present invention comprises the bi-phase mark reproduction apparatus which corrects the error produced in the bi-phase marks on the basis of the regularity of the bi-phase marks, so that the error rate of the demodulated data can be reduced by half and the demodulation ability of ATIP can be improved.

What is claimed is:

1. A bi-phase mark reproduction apparatus comprising:
    a synchronism detection section supplied with a signal modulated by bi-phase marks to produce a data separating signal for separating data to separate said signal into constituent portions thereof;
    a data conversion section that takes out a synchronous code portion, a data portion and an error detection code portion from a bi-phase mark input signal through said data separating signal and demodulating data of said data portion and said error detection code portion; and
    an error detection section that performs error detection to said data demodulated by said data conversion section;
    wherein said data conversion means section includes:
    a pattern retrieval section that detects a predetermined error pattern contained in said data portion; and
    a conversion table for converting a pattern detecting said error pattern into a corrected data string in accordance with a replacement rule based on bi-phase mark modulation.

2. A bi-phase mark reproduction apparatus according to claim 1, wherein said conversion section detects the predetermined error pattern included in said data portion, and checks regularity of said bi-phase mark input signal, and further replaces and demodulates said bi-phase mark input signal through said conversion table when said bi-phase mark input signal does not satisfy the regularity of said bi-phase mark input signal, and said conversion section demodulates said bi-phase mark input signal without replacement of said bi-phase mark input signal through said conversion table when said bi-phase mark input signal satisfies the regularity of said bi-phase mark input signal.

3. A bi-phase mark reproduction apparatus according to claim 1, wherein said conversion section detects the predetermined error pattern included in said data portion, and checks regularity of said bi-phase mark input signal, and further replaces and demodulates said bi-phase mark input signal through said conversion table when said bi-phase mark input signal does not satisfy the regularity of said bi-phase mark input signal.

4. A bi-phase mark reproduction apparatus according to claim 3, wherein checking of the regularity of said bi-phase mark input signal is performed by whether or not 0 and 1 are inverted at a partition at every two bits of inputted data.

5. A bi-phase mark reproduction apparatus according to claim 3, wherein checking of the regularity of said bi-phase mark input signal is performed by whether or not 0 and 1 are inverted at a partition at every two bits of inputted data, and wherein said data conversion section decides that said bi-phase mark input signal satisfies the regularity of the bi-phase mark when 0 and 1 are inverted at a partition at every two bits of inputted data.

6. A bi-phase mark reproduction apparatus according to claim 3, wherein checking of the regularity of said bi-phase mark input signal is performed by whether or not 0 and 1 are inverted at a partition at every two bits of inputted data, and wherein said data conversion section decides that said bi-phase mark input signal does not satisfy the regularity of the bi-phase mark when 0 and 1 are not inverted at a partition at every two bits of inputted data, and further decides that a rear bit of two bits of the data which is decided not to satisfy the regularity is correct and re places a front bit thereof.

7. An optical disk drive device comprising:
an optical pickup for irradiating an optical disk with laser light to reproduce data from or record the data in said optical disk;
a signal processing section that digitizes a signal produced by said optical pickup into a binary signal and producing a control signal;
a decoder section that demodulates data from said signal processing section;
a laser drive section that controls emission of said laser light;
an actuator section that controls operation of said optical pickup;
a spindle drive section that controls driving of a spindle motor which rotates said optical disk; and
a servo control section that performs servo control on the basis of said control signal,
wherein said optical disk drive device further comprises said bi-phase mark reproduction apparatus according to claim 1.

* * * * *